United States Patent
Linder et al.

(10) Patent No.: US 12,387,595 B2
(45) Date of Patent: Aug. 12, 2025

(54) VEHICLE HEIGHT SENSING SYSTEM

(71) Applicants: Renee Linder, Lacey, WA (US); James Linder, Lacey, WA (US)

(72) Inventors: Renee Linder, Lacey, WA (US); James Linder, Lacey, WA (US)

( * ) Notice: Subject to any disclaimer, the term of this patent is extended or adjusted under 35 U.S.C. 154(b) by 83 days.

(21) Appl. No.: 18/386,640

(22) Filed: Nov. 3, 2023

(65) Prior Publication Data

US 2025/0148908 A1    May 8, 2025

(51) Int. Cl.
  *G08G 1/04*    (2006.01)
  *G01B 11/14*   (2006.01)
  *G08G 1/07*    (2006.01)

(52) U.S. Cl.
  CPC .............. *G08G 1/04* (2013.01); *G01B 11/14* (2013.01); *G08G 1/07* (2013.01)

(58) Field of Classification Search
  CPC .................................. G01B 11/14; G08G 1/07
  See application file for complete search history.

(56) References Cited

U.S. PATENT DOCUMENTS

| | | |
|---|---|---|
| 4,284,971 A | 8/1981 | Lowry |
| 5,276,426 A * | 1/1994 | LoBello .................. B60Q 1/52 |
| | | 200/61.42 |
| D561,052 S | 2/2008 | Lau |
| 8,810,382 B1 | 8/2014 | Laurita |
| 9,269,263 B2 | 2/2016 | Gieseke |
| 9,847,025 B2 | 12/2017 | Mohtashami |
| 10,229,596 B1 | 3/2019 | Weinberg |
| 10,843,694 B2 | 11/2020 | Schmidt |
| 11,348,492 B1 * | 5/2022 | Hoinowski ............. F21V 21/00 |
| 11,487,010 B2 | 11/2022 | Singhal |
| 11,790,777 B2 * | 10/2023 | Krishna ............... G08G 1/0141 |
| | | 340/905 |
| 2012/0139756 A1 * | 6/2012 | Djurkovic .............. G08G 1/095 |
| | | 340/905 |
| 2015/0364041 A1 * | 12/2015 | Mohtashami ............ G01C 5/00 |
| | | 702/166 |
| 2020/0156630 A1 * | 5/2020 | Schmidt ............ B60W 30/0956 |
| 2023/0298467 A1 * | 9/2023 | Krishna ............... G08G 1/0145 |
| | | 340/905 |

FOREIGN PATENT DOCUMENTS

GB    2514127    5/2013

* cited by examiner

*Primary Examiner* — Sisay Yacob

(57) ABSTRACT

A vehicle height sensing system for determining and indicating to a user whether a vehicle height exceeds a clearance height of an overhead obstruction includes a display panel is configured to be visible from a vehicle when the vehicle is driving toward the overhead obstruction. A measurement device is in communication with and operationally coupled to the display panel. The measurement device measures the vehicle height and communicates the vehicle height to the display panel. The measurement device includes a pair of poles that are positioned on opposite shoulders of a roadway and are aligned with each other across the roadway. Each of the pair of poles is in communication with the other to determine the vehicle height. The display panel provides a positive indicium when the vehicle height is less than the clearance height and a negative indicium when the vehicle height is greater than the clearance height.

8 Claims, 15 Drawing Sheets

VEHICLE HEIGHT SENSING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle clearance alert systems and more particularly pertains to a new vehicle clearance alert system for determining and indicating to a driver whether a vehicle height exceeds a clearance height of an overhead obstruction.

(2) Description of Related Art Including Information Disclosed Under 37 CFR 1.97 and 1.98

The prior art relates to vehicle clearance alert systems. These systems are used to determine whether a height of a vehicle exceeds a clearance height of an overhead obstruction, such as a bridge or overpass. The systems may alert the driver if the vehicle height exceeds the clearance height so that the driver can avoid the overhead obstruction. Some such systems are integrated into the vehicle and are configured to measure the clearance height as the vehicle approaches the overhead obstruction. These systems may be attached to an exterior of the vehicle, either when the vehicle is originally manufactured or as an aftermarket part that can be added to the vehicle. However, these systems are not available to a user who does not have the system installed with their vehicle. These systems also typically do not provide any positive feedback when the vehicle height is less than the clearance height and it is safe for the vehicle to proceed under the overhead obstruction. Other systems are designed to be coupled to the overhead obstruction, for example providing measurements of the clearance height that the user can view as the vehicle approaches the overhead obstruction. A simple example is a warning sign displaying the clearance height for the user. A more complex example are systems of height measuring devices that are mounted to the overhead obstruction and that are coupled to an electronic display device that displays the clearance height below the overhead obstruction. However, these systems typically rely on the user knowledge and memorization of the vehicle height so that the user can determine for themselves whether the vehicle height exceeds the clearance height. Thus, there is a need for a system that does not need to be installed on the vehicle and that can alert the user when the vehicle height is both above and below the clearance height without relying on the user's memorization of the vehicle height.

BRIEF SUMMARY OF THE INVENTION

An embodiment of the disclosure meets the needs presented above by generally comprising an overhead obstruction having a clearance height and that is positioned over a roadway. An oncoming vehicle has a vehicle height. A display panel is configured to be visible from the vehicle when the vehicle is driving toward the overhead obstruction. A measurement device is in communication with and operationally coupled to the display panel. The measurement device is configured to measure the vehicle height of the vehicle and communicate the vehicle height to the display panel. The measurement device includes a pair of poles that are aligned with each other across the roadway. The pair of poles is positioned on opposite shoulders of the roadway and is spaced from the overhead obstruction. Each of the pair of poles is in communication with the other whereby the pair of poles determines the vehicle height. The display panel provides a positive indicium when the vehicle height is less than the clearance height. The display panel provides a negative indicium when the vehicle height is greater than the clearance height.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
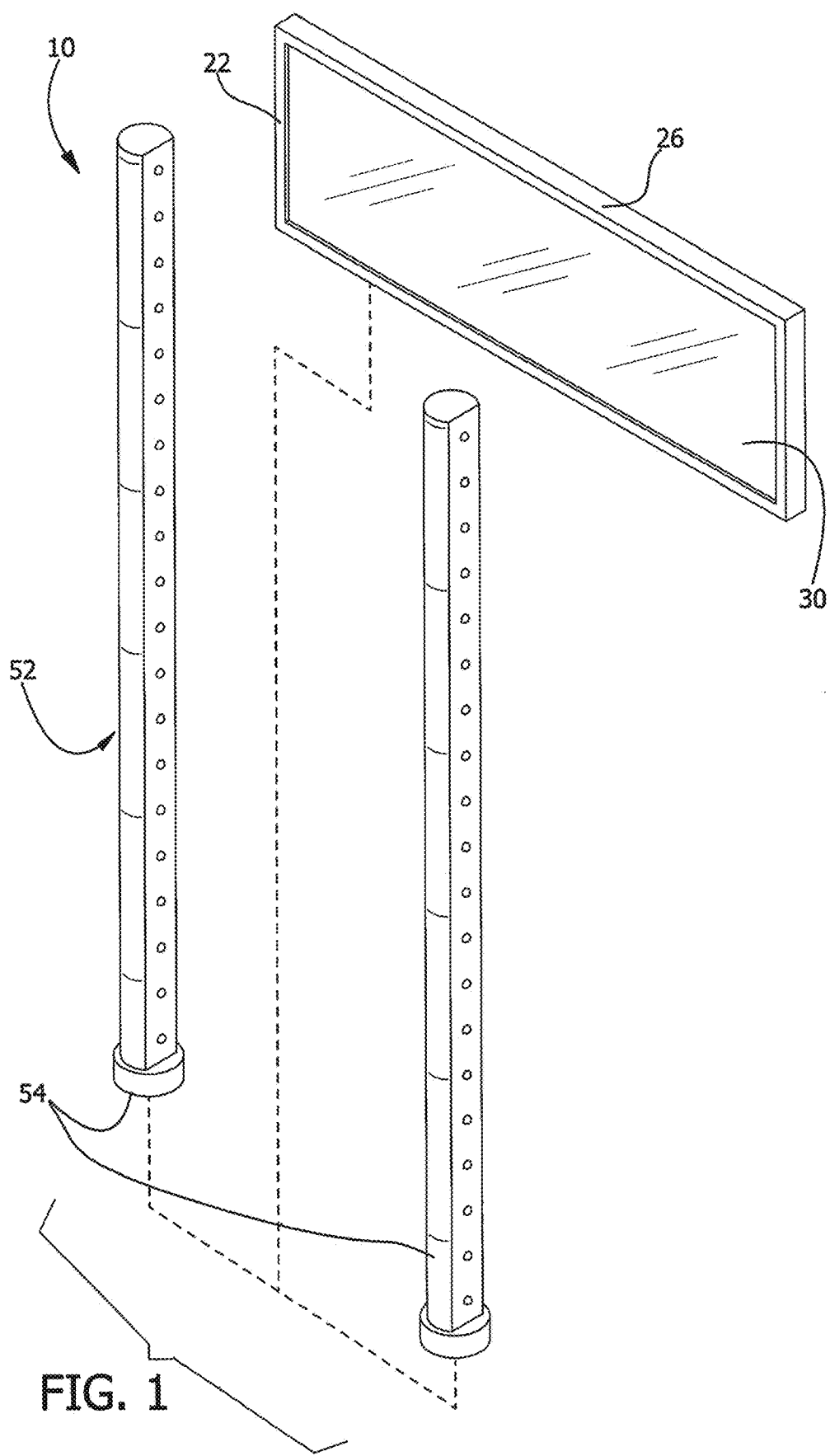
FIG. 1 is an isometric view of a vehicle height sensing system according to an embodiment of the disclosure.
Figure 2:
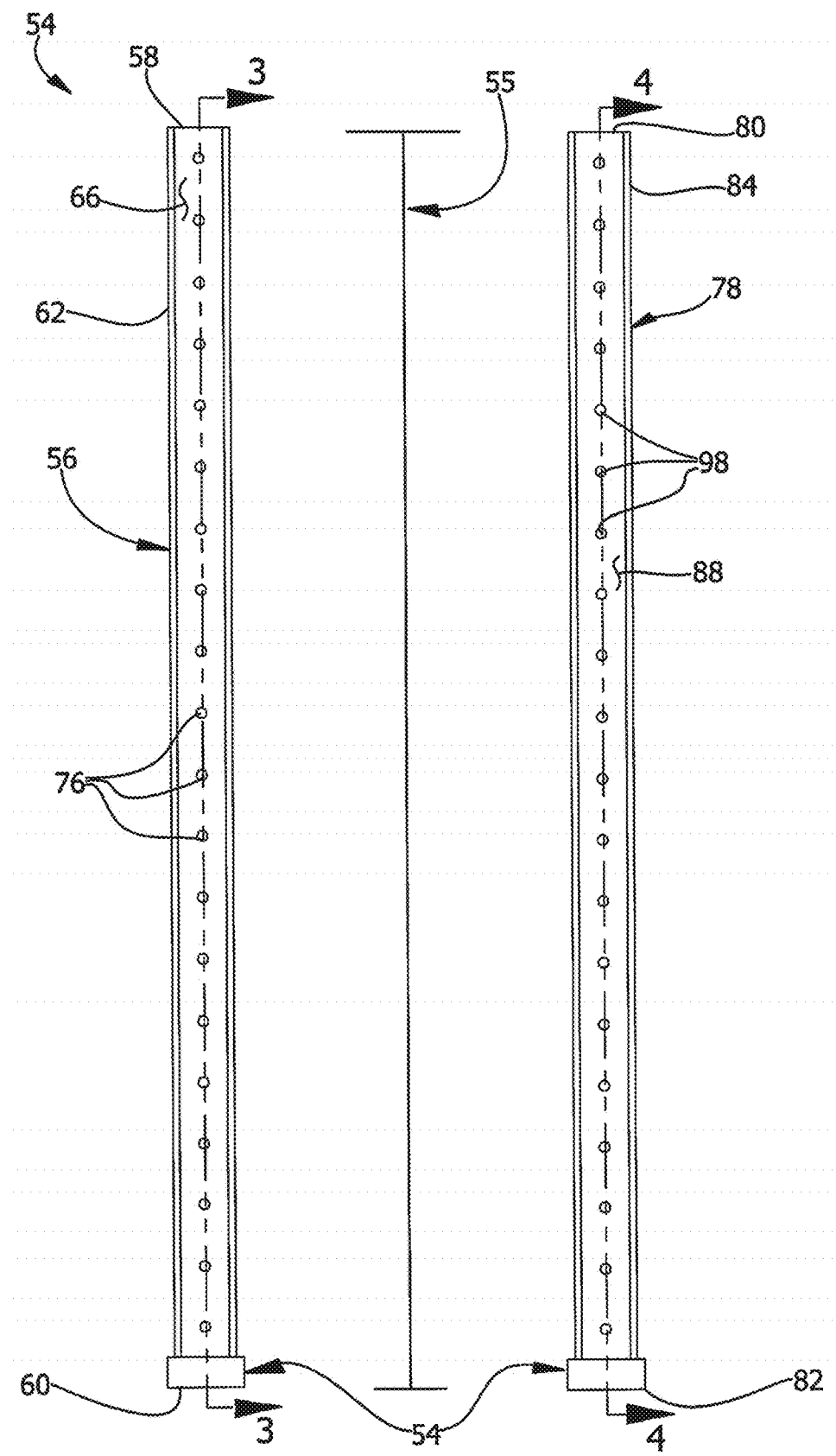
FIG. 2 is a front view of an embodiment of the disclosure.
Figure 3:
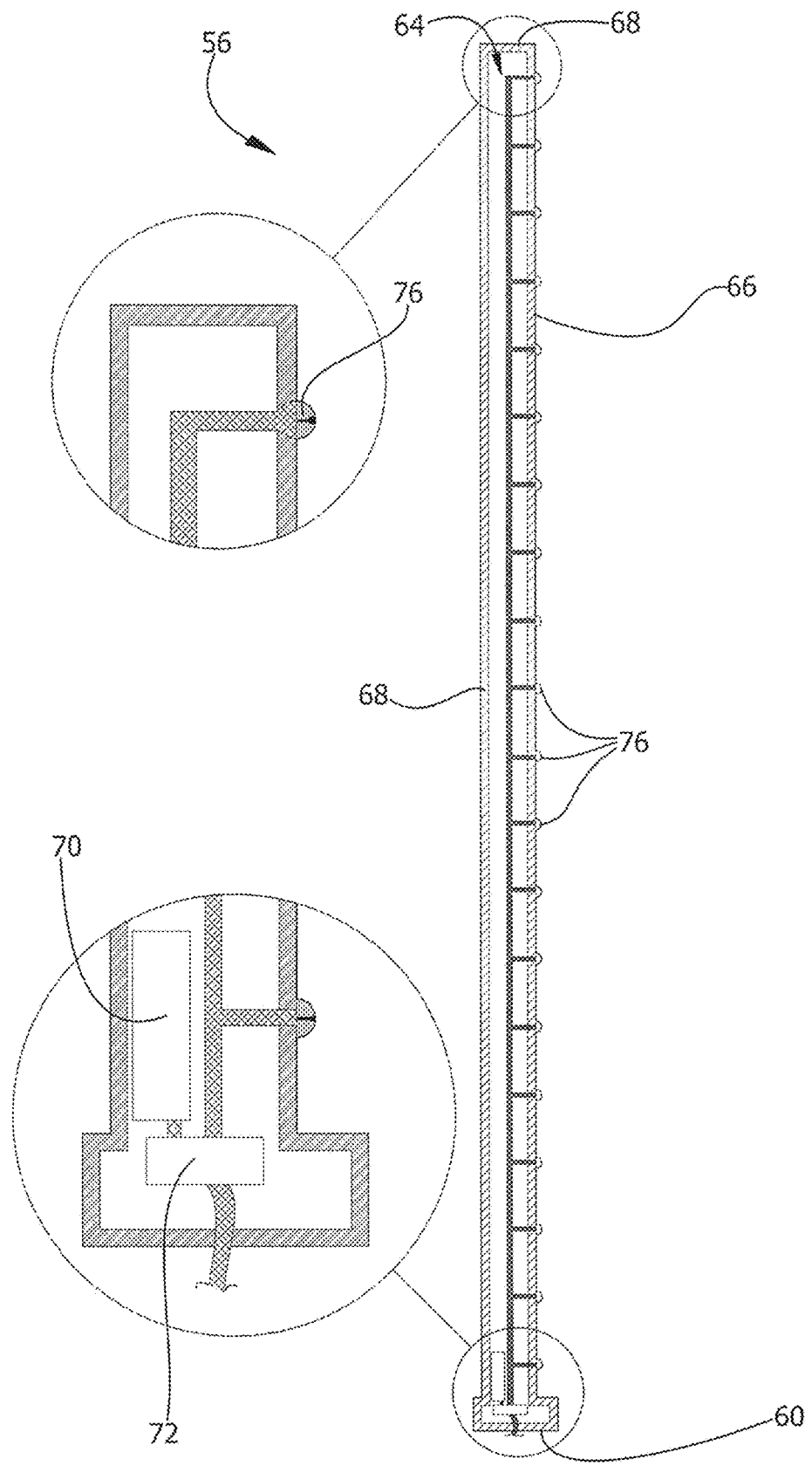
FIG. 3 is a cross-sectional view of an embodiment of the disclosure.
Figure 4:
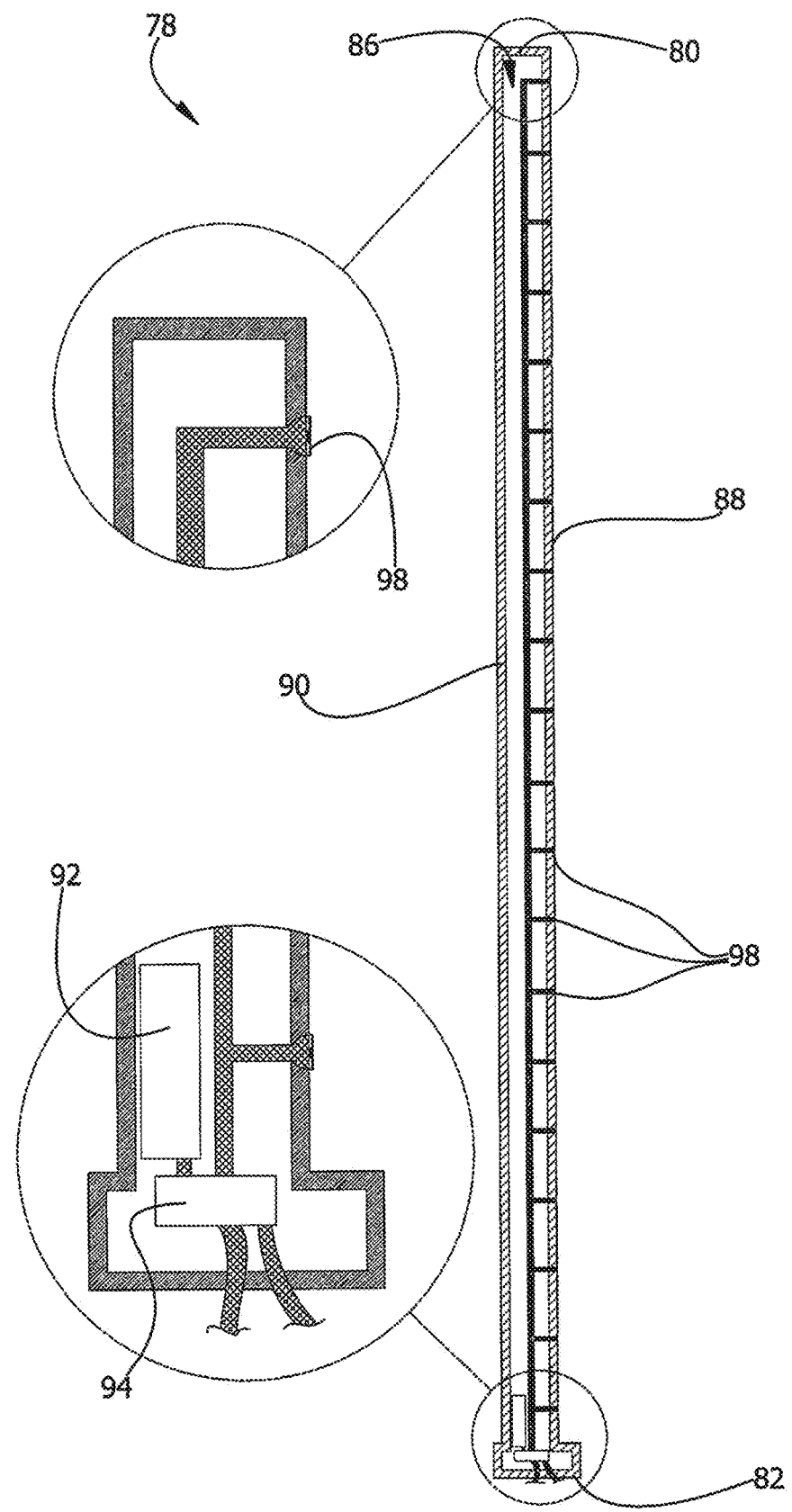
FIG. 4 is a cross-sectional view of an embodiment of the disclosure.

With reference now to the drawings, and in particular to FIGS. 1 through 15 thereof, a new vehicle clearance alert system embodying the principles and concepts of an embodiment of the disclosure and generally designated by the reference numeral 10 will be described.

As best illustrated in FIGS. 1 through 15, the vehicle height sensing system 10 generally comprises an overhead obstruction 12 having a clearance height 13 and that is positioned over a roadway 14. The clearance height 13 is generally the distance between the roadway 14 and the lowest portion of the overhead obstruction 12, or the maximum height of an object that can fit beneath the overhead obstruction 12. A vehicle 18 has a vehicle height 19. The vehicle height sensing system 10 includes a measurement device 52 that determines the vehicle height 19 and compares the vehicle height to the clearance height 13 to indicate whether the vehicle 18 can safely pass under the overhead obstruction 12 without colliding with the overhead obstruction 12. A display panel 20 communicatively coupled to the measurement device 52 indicates whether the vehicle 18 is safe to proceed beneath the overhead obstruction 12.

A display panel 20 is configured to be visible from the vehicle 18 when the vehicle 18 is driving toward the overhead obstruction 12. The display panel 20 generally comprises a front side 22, a back side 35, and a peripheral side 26 extending therebetween to define an inner area 28. A screen 30 is coupled to the front side 22. A panel power source 32, such as a battery, is positioned in the inner area 28. A panel central processing unit 34 is positioned in the inner area 28. The panel central processing unit 34 is electronically coupled to the panel power source 32 and the screen 30. The panel central processing unit 34 controls information that is displayed on the screen 30. In some embodiments, a panel transceiver 36 is positioned in the inner area 28. The panel transceiver 36 is electronically coupled to and in communication with the panel central processing unit 34 thereby facilitating the panel central processing unit 34 in wirelessly communicating with the measurement device 52.

Figure 5:
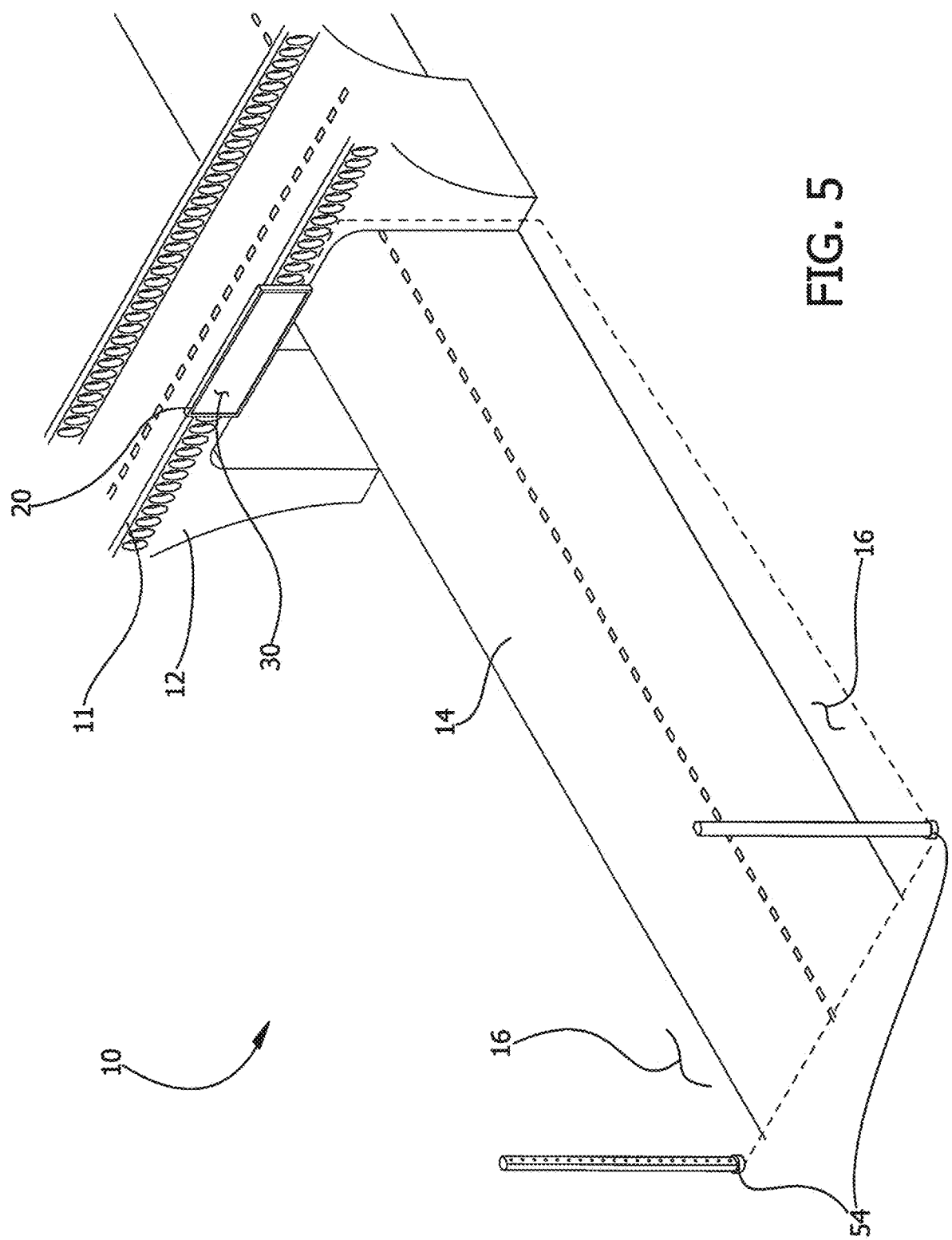
FIG. 5 is a perspective view of an embodiment of the disclosure.
Figure 6:
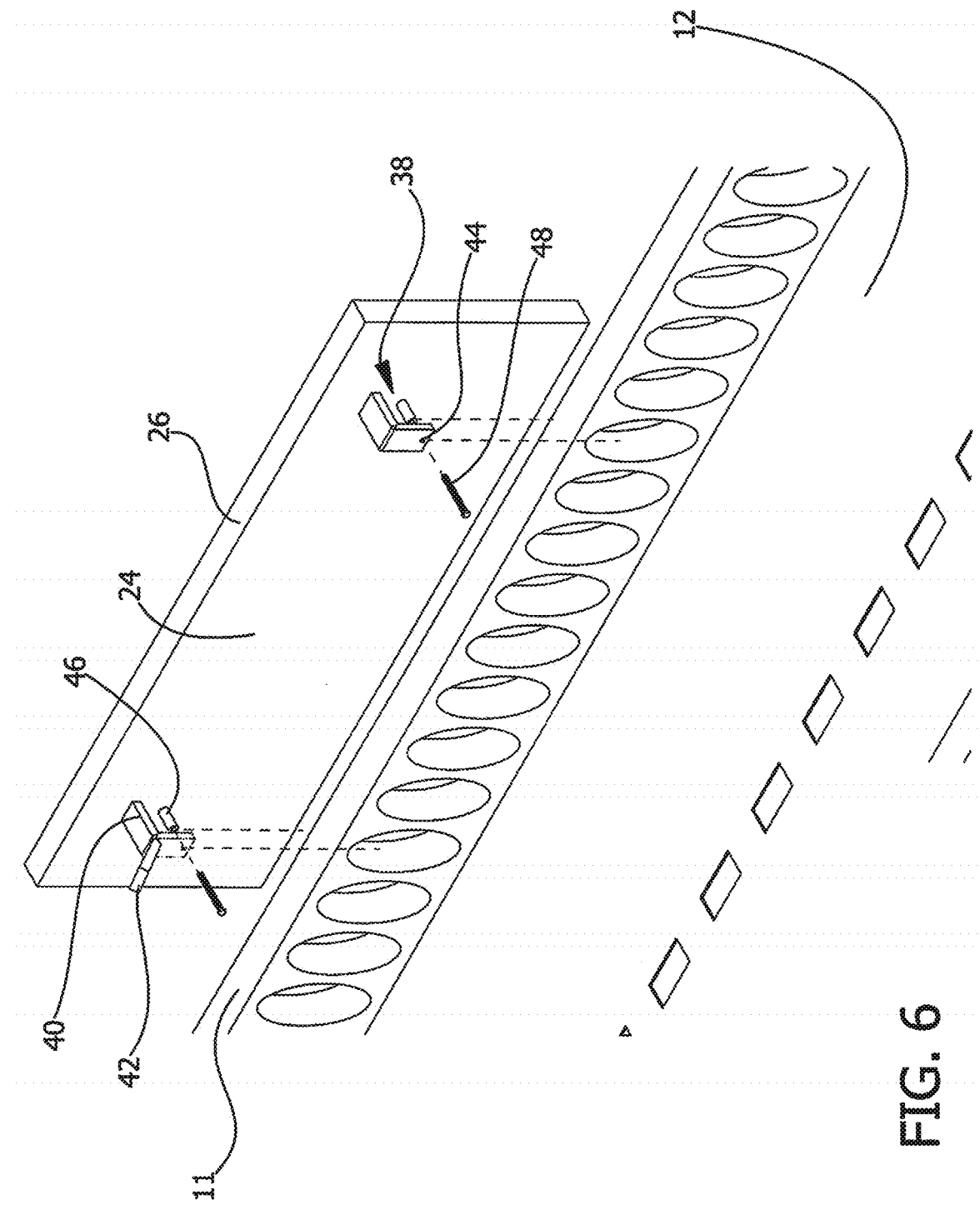
FIG. 6 is a rear exploded view of an embodiment of the disclosure.
Figure 7:
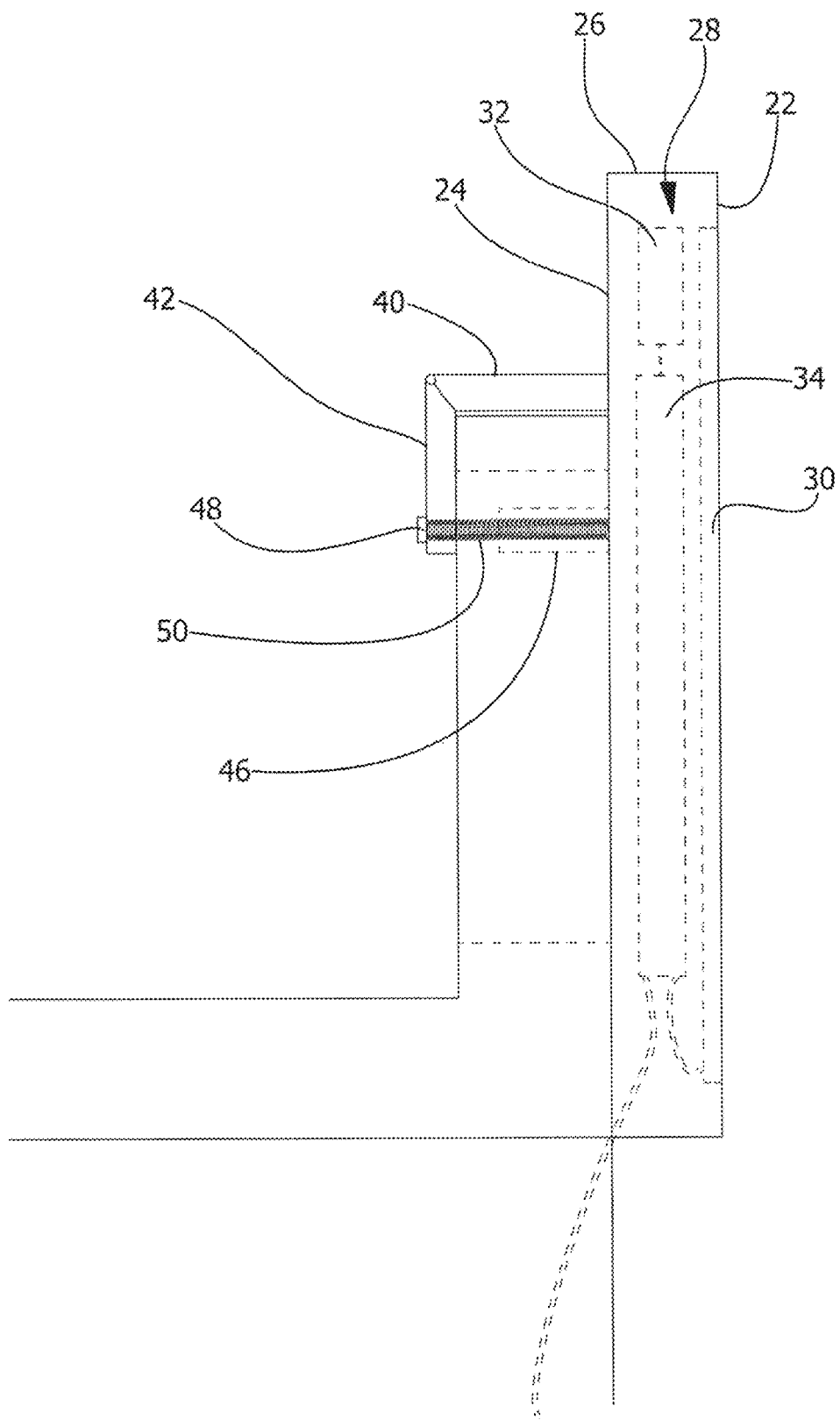
FIG. 7 is a side detail view of an embodiment of the disclosure.

An attachment 38 may be included which couples the display panel 20 to the overhead obstruction 12. For example, the attachment may comprise a first member 40 that is coupled to and extends outwardly from the back side 24 of the display panel 20. The first member 40 generally has a length that is configured to exceed a width of a barrier 11 extending upwardly from the overhead obstruction 12. For example, when the overhead obstruction 12 comprises a bridge as depicted in FIG. 5, the barrier 11 may comprise a wall extending upwardly from the bridge. The attachment 38 facilitates hanging the display panel 20 on the wall, or barrier 11, such that the screen 30 is visible from the roadway 14 below the overhead obstruction 12.

A second member 42 may be pivotably attached to the first member 40. The second member 42 may pivot between an upward position and a downward position. The second member 42 is generally perpendicular to and extends downwardly from the first member 40 when the second member 42 is in the downward position. The second member 42 may have an aperture 44 therein that is aligned with a channel 46 extending into the back side 24 when the second member 42 is in the downward position. A fastener 48 extends through the aperture 44 and engaging the channel 46 whereby the second member 42 is locked into the downward position and the back side 24 is coupled to the overhead obstruction 12. For example, the fastener 48 may have a fastener threading 50 and the channel 46 having a channel threading. The fastener threading 50 is generally complementary to the channel threading whereby the fastener 48 engages the channel 46.

The measurement device 52 is in communication with and operationally coupled to the display panel 20. The measurement device 52 is configured to measure the vehicle height 19 and communicate the vehicle height 19 to the display panel 20. The measurement device 52 generally comprises a pair of poles 54 that are aligned with each other across the roadway 14. Each of the pair of poles 54 is positioned on a shoulder 16 of the roadway 14, for example being on an opposite shoulder 16 of the roadway 14 from the other. The pair of poles 54 is spaced from the overhead obstruction 12 so that the vehicle 18 can view the information that is displayed on the screen 30 after the vehicle 18 drives between the pair of poles 54 and before the vehicle 18 passes beneath the overhead obstruction 12. In most embodiments, each of the pair of poles 54 has a pole height 55 which exceeds the clearance height 13, whereby the pair of poles 54 can measure the vehicle height 19 when the vehicle height 19 exceeds the clearance height 13. Each of the pair of poles 54 is in communication with the other whereby the pair of poles 54 determines the vehicle height 19.

Figure 8:
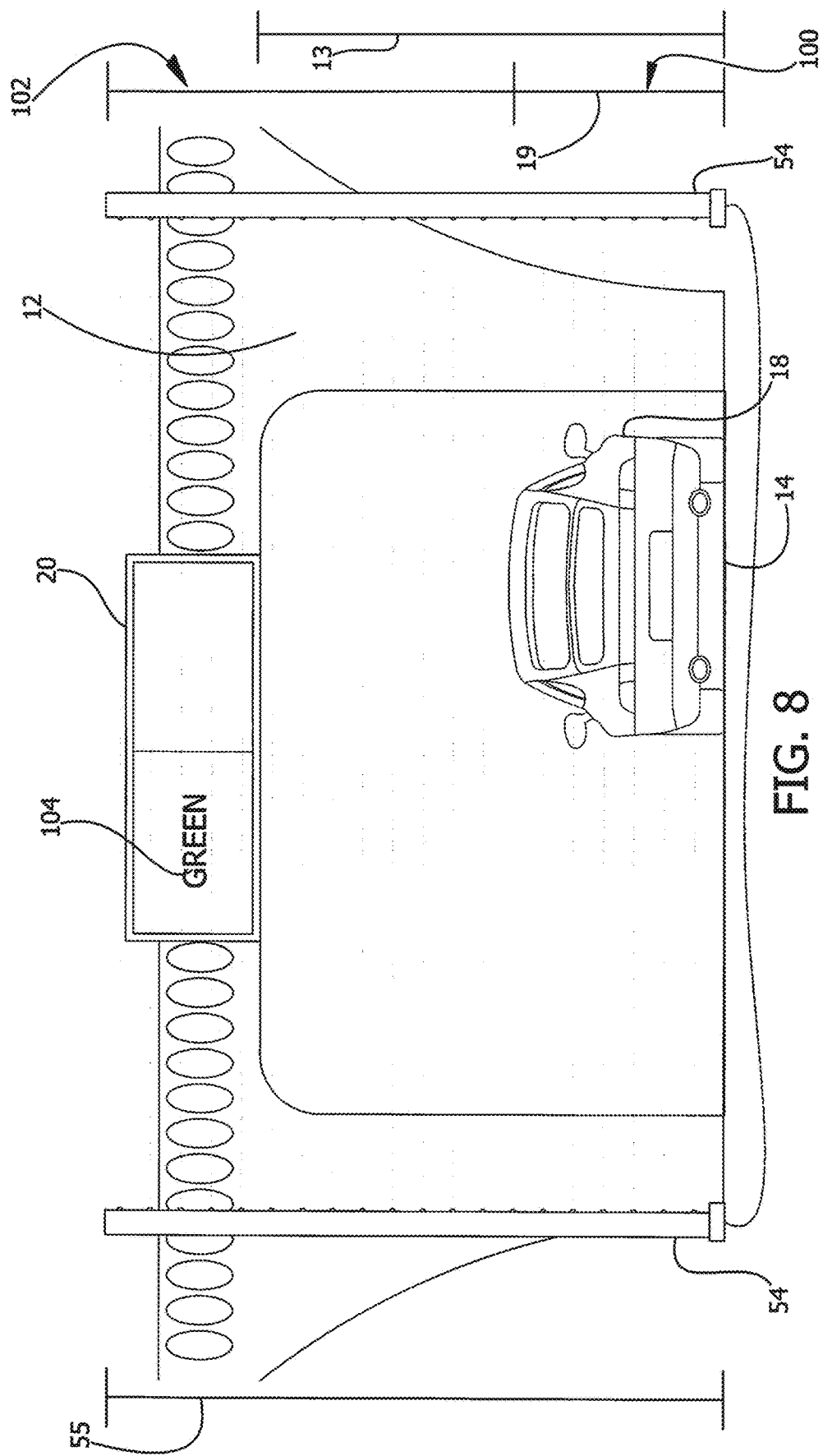
FIG. 8 is an in-use view of an embodiment of the disclosure.
Figure 9:
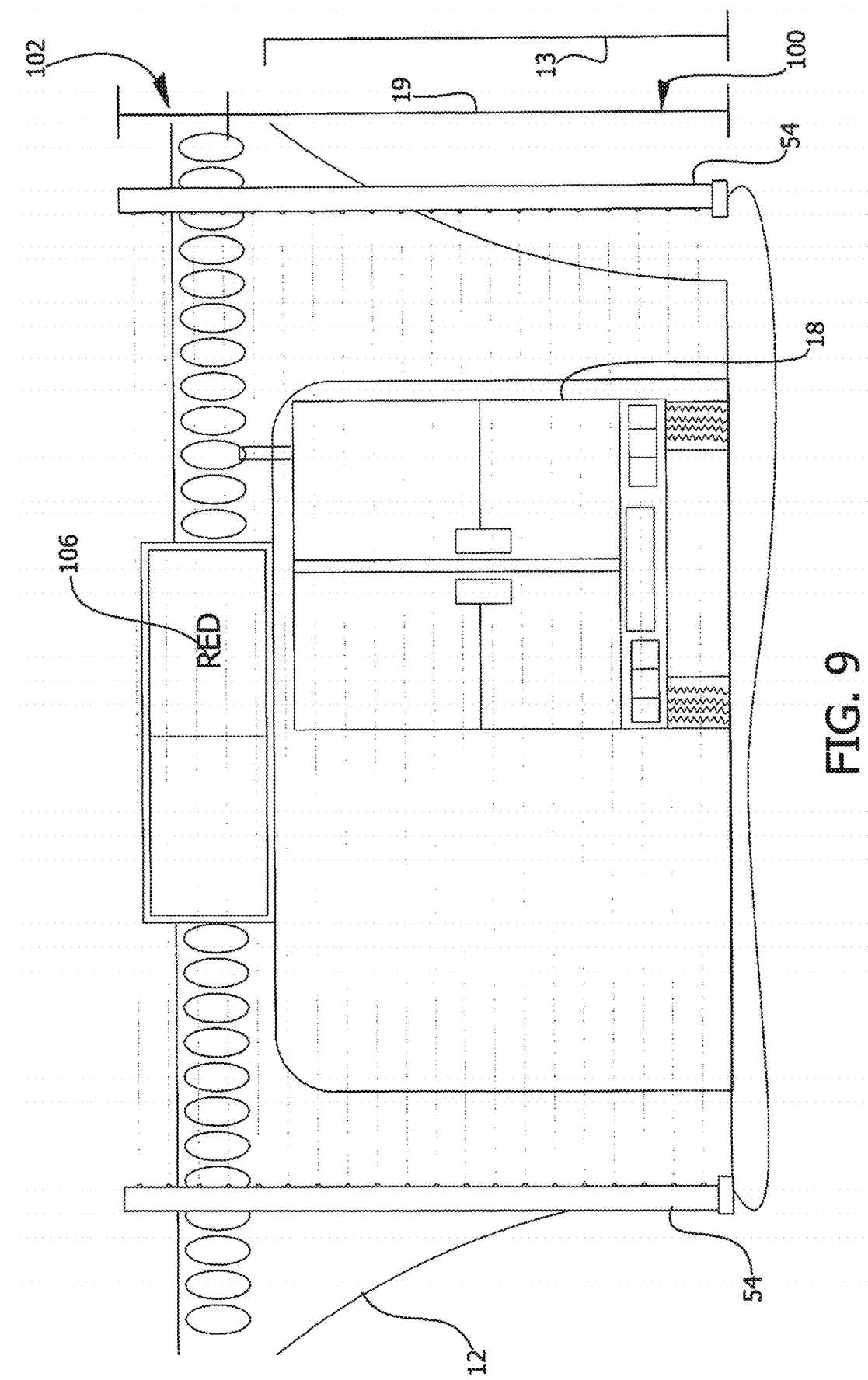
FIG. 9 is an in-use view of an embodiment of the disclosure.
Figure 10:
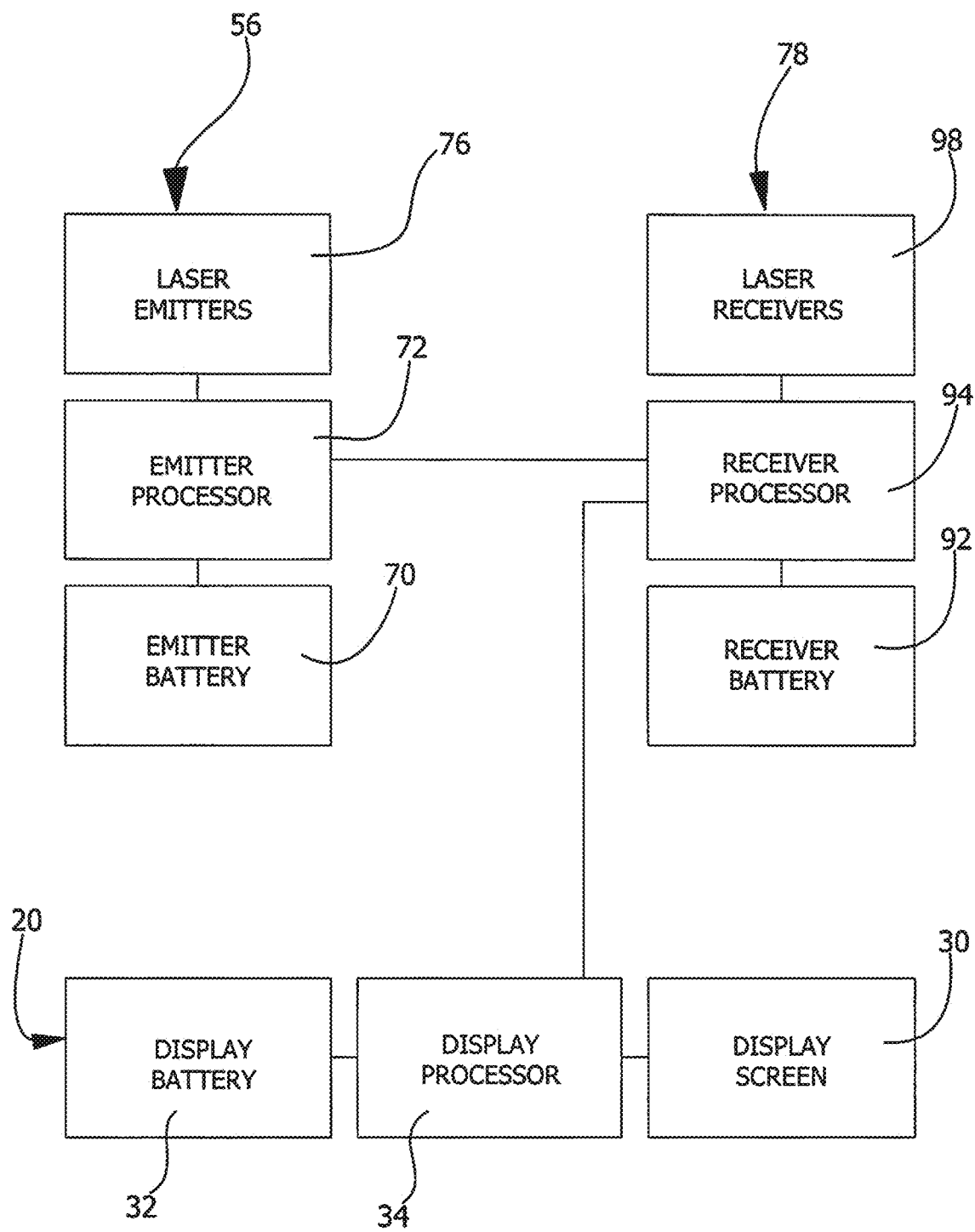
FIG. 10 is a block diagram view of an embodiment of the disclosure.
Figure 11:
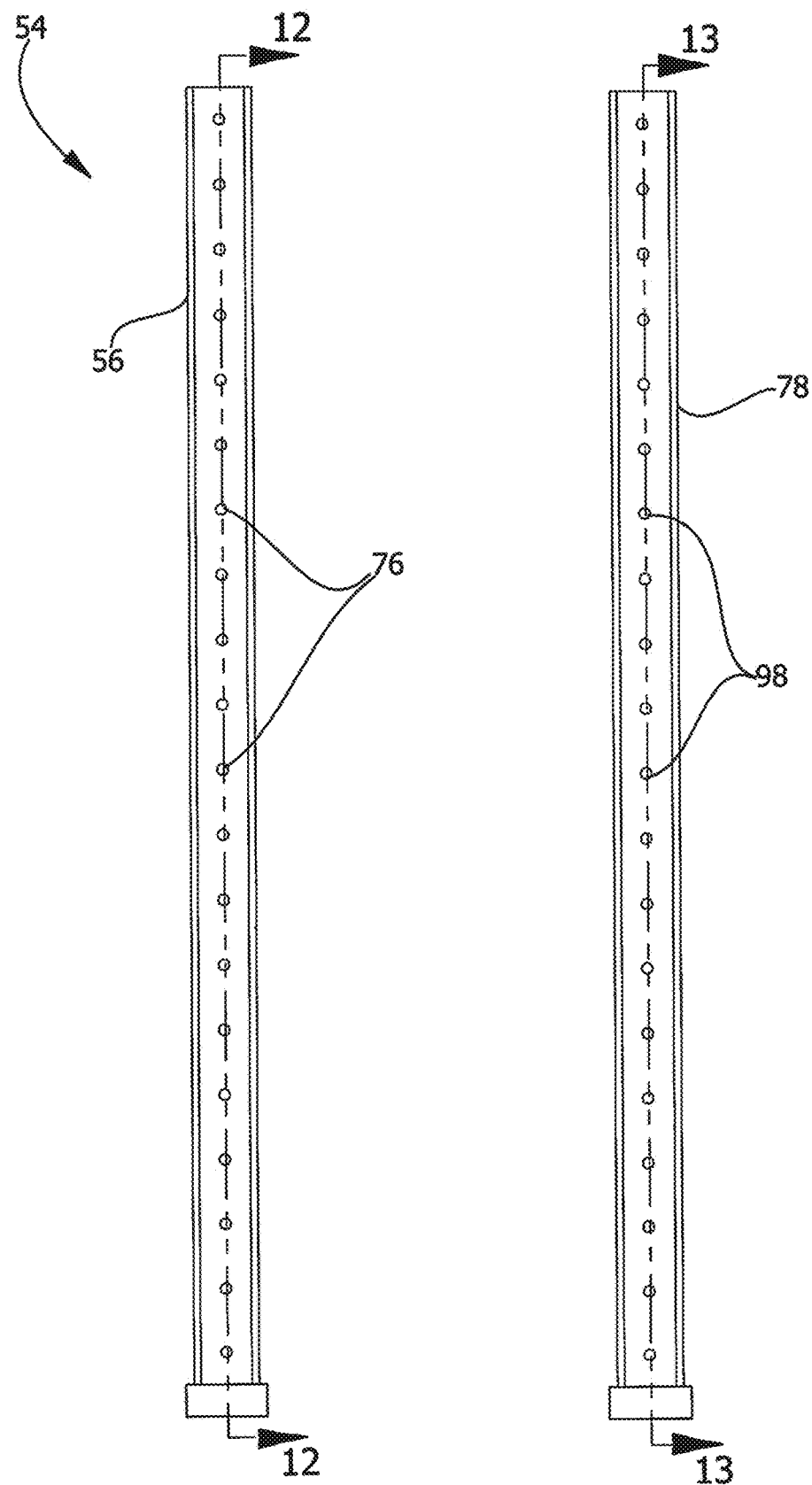
FIG. 11 is a front view of an embodiment of the disclosure.
Figure 12:
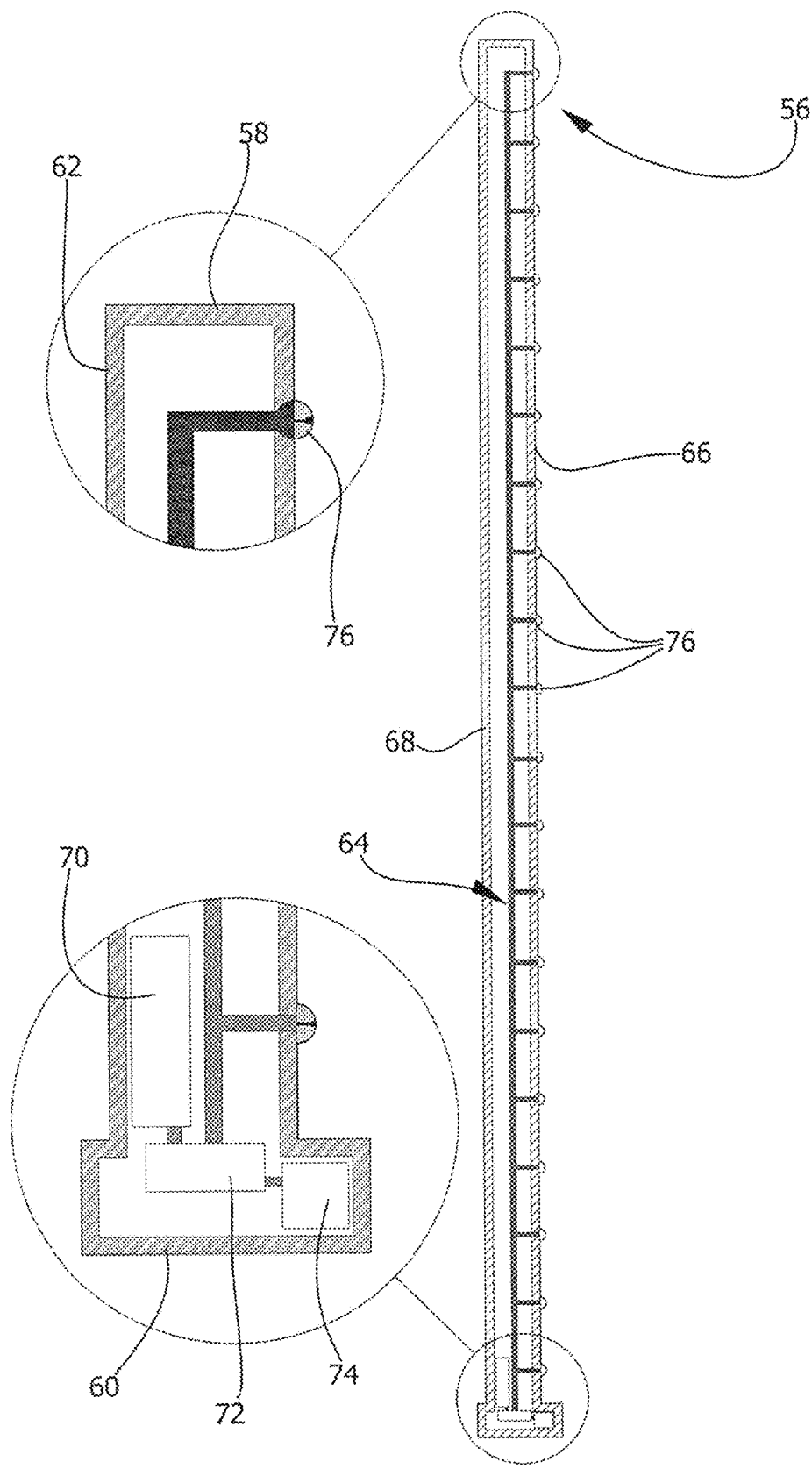
FIG. 12 is a cross-sectional view of an embodiment of the disclosure.
Figure 13:
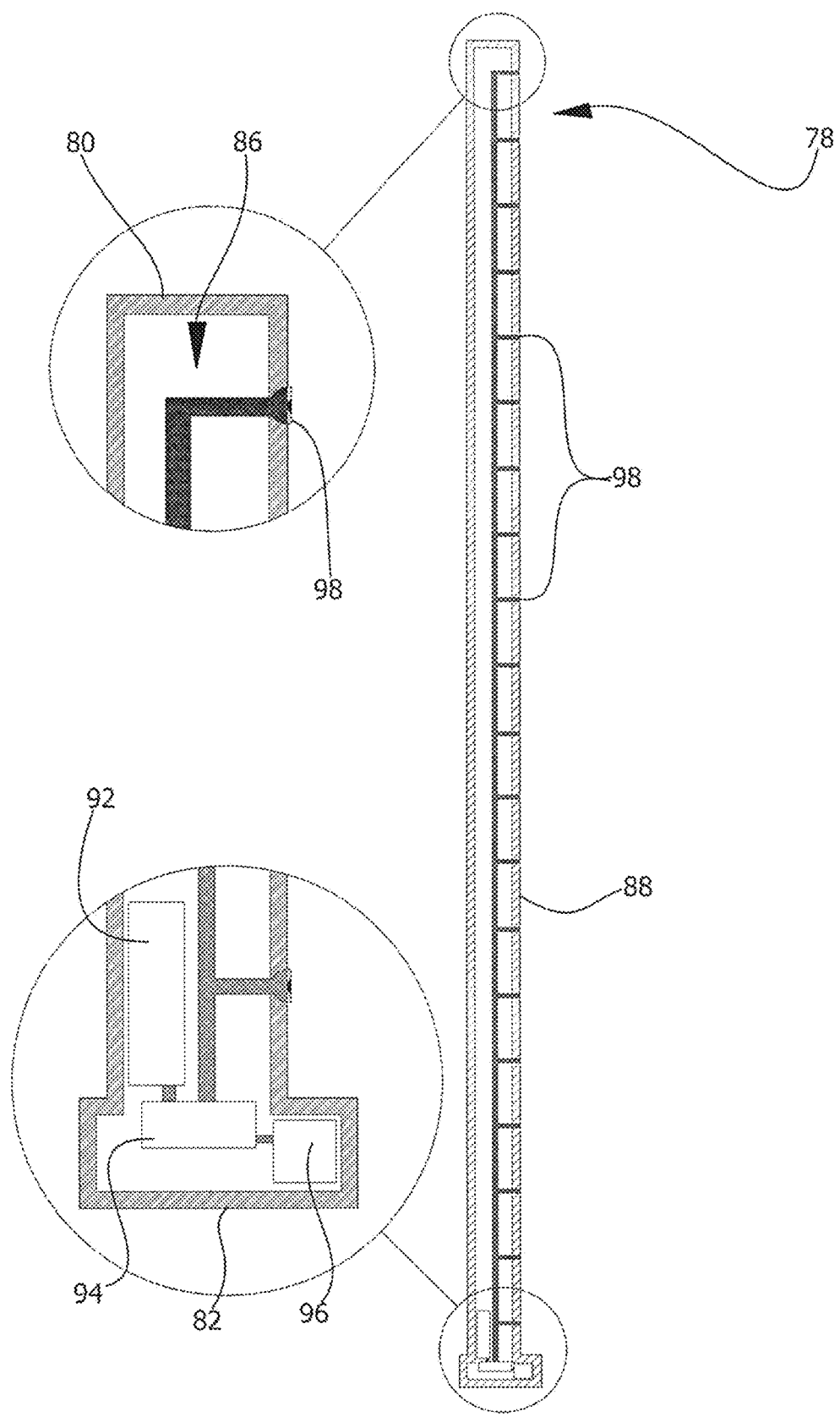
FIG. 13 is a cross-sectional view of an embodiment of the disclosure.
Figure 14:
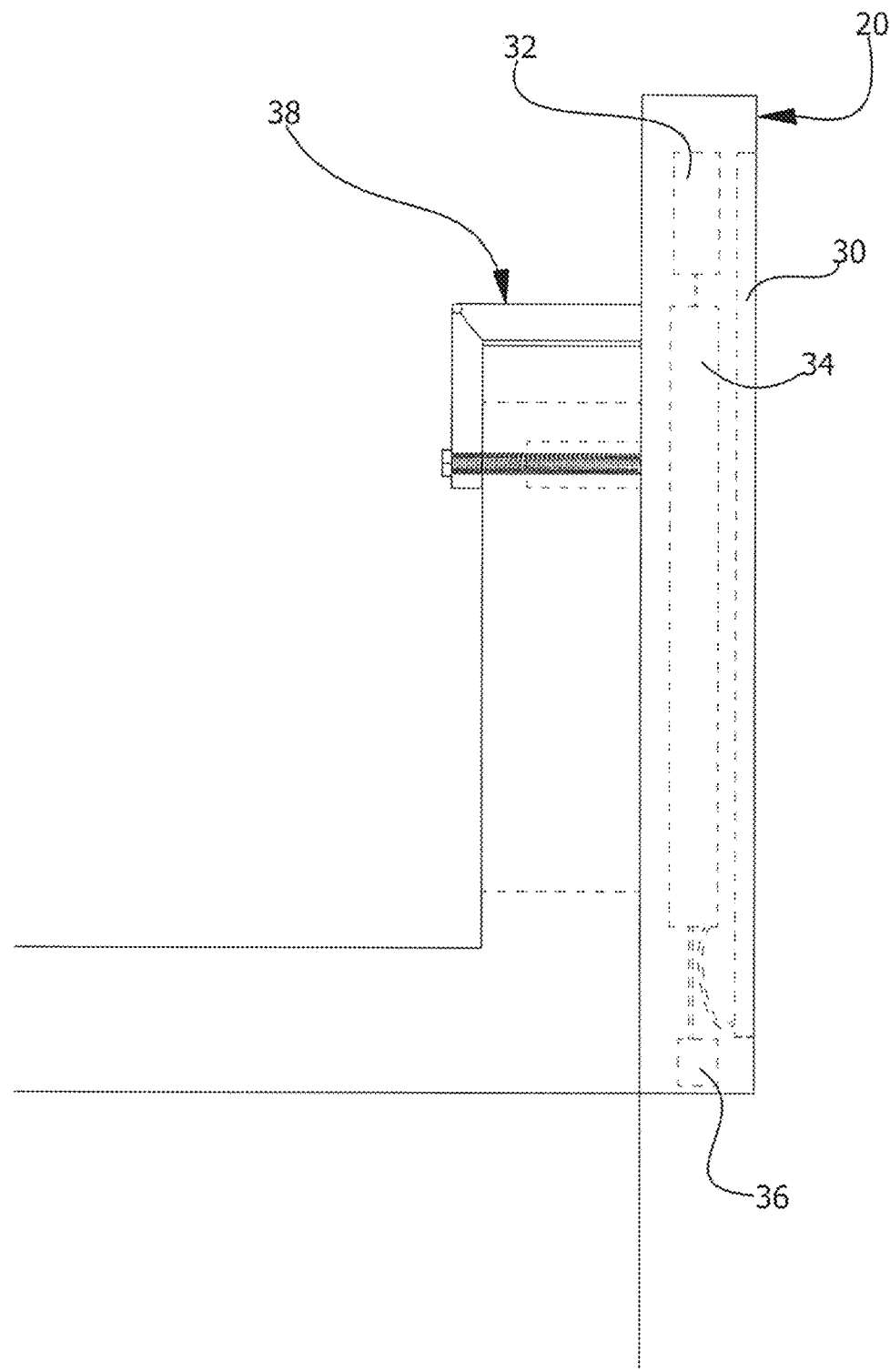
FIG. 14 is a side detail view of an embodiment of the disclosure.

The pair of poles 54 generally comprises an emitter pole 56 and a receiver pole 78. The emitter pole 56 is generally configured to emit light toward the receiver pole 78. The receiver pole 78 senses the emitted light. When the vehicle 18 drives between the pair of poles 54, the vehicle 18 blocks a lower portion 100 of the emitted light such that the receiver pole 78 only senses an upper portion 102 of the emitted light that is above the vehicle height 19. The lower portion 100 thereby corresponds to the vehicle height 19. If the lower portion 100, or vehicle height 19, is less than the clearance height 13, the vehicle 18 can safely pass beneath the overhead obstruction 12, as shown in FIG. 8. However, if the lower portion 100, or vehicle height 19, exceeds the clearance height 13, the vehicle 18 is too tall and cannot safely pass beneath the overhead obstruction 12, as shown in FIG. 9. The pair of poles 54 communicates the vehicle height 19 to the panel central processing unit 34, which actuates the screen 30 to indicate whether the vehicle 18 can safely pass beneath the overhead obstruction 12. In the example provided in FIG. 10, the receiver pole 56 may communicate the vehicle height 19 to the panel central processing unit 34.

Figure 15:
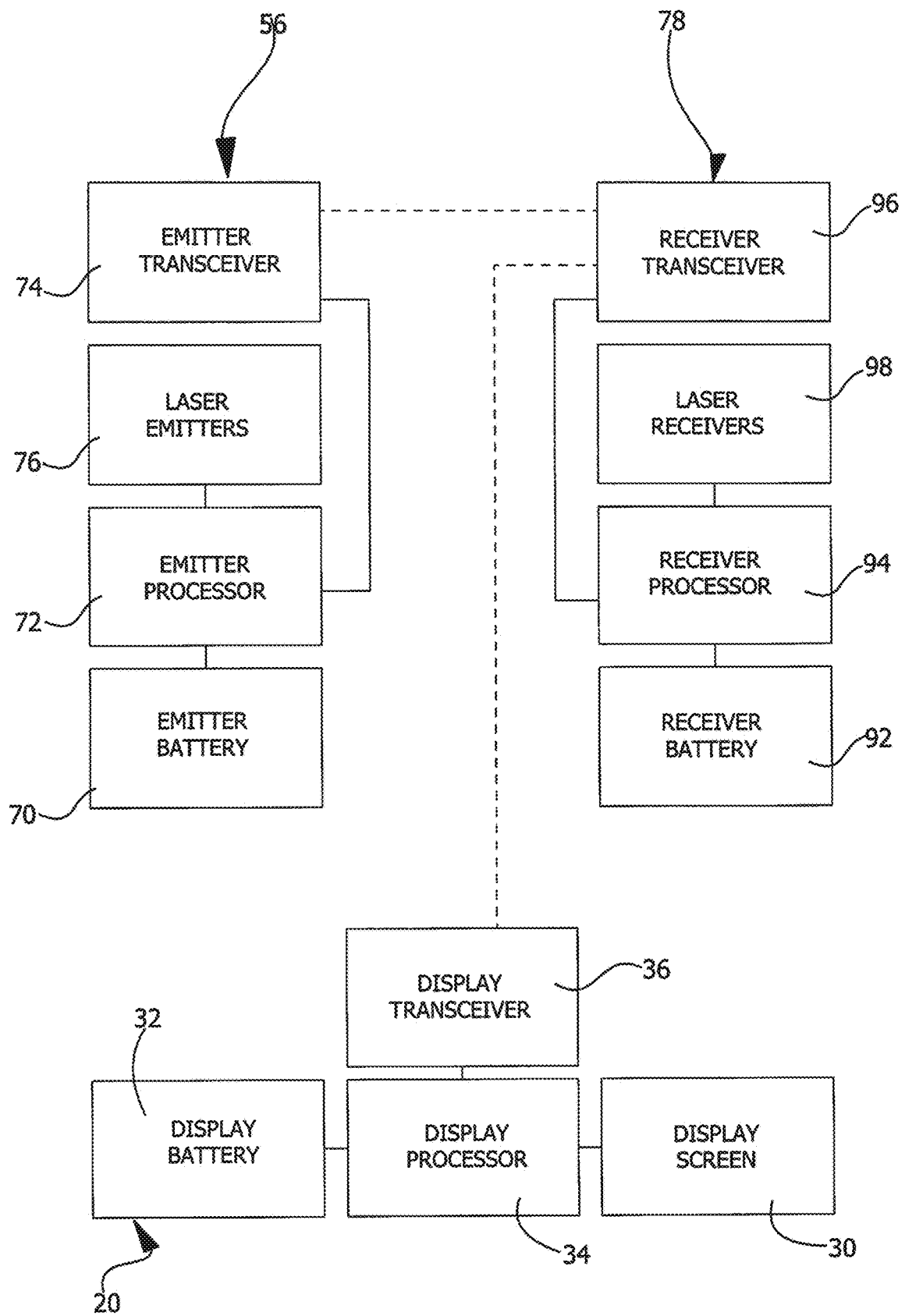
FIG. 15 is a block diagram view of an embodiment of the disclosure.

The emitter pole 56 generally has an emitter top wall 58, an emitter bottom wall 60, and an emitter peripheral wall 62 extending therebetween defining an emitter interior space 64. The emitter peripheral wall 62 has an emitter front side 66 and an emitter rear side 68. The emitter pole 56 may also include an emitter power source 70, such as a battery, that is positioned in the emitter interior space 64. An emitter processor 72 is positioned in the emitter interior space 64 and is electronically coupled to the emitter power source 70. In some embodiments, an emitter transceiver 74 is positioned in the emitter interior space 64 and is electronically coupled to and in communication with the emitter processor 72. The emitter transceiver 74 facilitates wireless communication between the emitter pole 46 and the receiver pole 78, as shown in FIG. 15.

A plurality of lights 76 is coupled to the emitter front side 66. Each of the plurality of lights 76 is aligned the others and is positioned between the emitter top wall 58 and the emitter bottom wall 60. For example, the plurality of lights 76 may cover the pole height 55 whereby the plurality of lights 76 can be used to measure any vehicle height 19 that is between the height of the emitter bottom wall 60 and the emitter top wall 58. The plurality of lights 76 is electronically coupled to and controlled by the emitter processor 72. The plurality of lights 76 may comprise laser lights, for example being infrared so that the plurality of lights 76 is not visible to a user and thereby does not distort the user's view of the roadway 14 between the pair of poles 54 and the overhead obstruction 12.

The receiver pole 78 generally has a receiver top wall 80, a receiver bottom wall 82, and a receiver peripheral wall 84 extending therebetween defining a receiver interior space 86. The receiver peripheral wall 84 has a receiver front side 88 and a receiver rear side 90. The receiver pole 78 may also include a receiver power source 92, such as a battery, that is positioned in the receiver interior space 86. A receiver processor 94 is positioned in the receiver interior space 86 and is electronically coupled to the receiver power source 92. In some embodiments, a receiver transceiver 96 is positioned in the receiver interior space 86. The receiver transceiver 96 is electronically coupled to and in communication with the receiver processor 94. The receiver transceiver 96 is also in communication with the emitter transceiver 74 and with the panel transceiver 36 to facilitate wireless communication between the receiver pole 78, the emitter pole 56, and the display panel 20.

A plurality of light sensors 98 is coupled to the receiver front side 88. Each of the plurality of light sensors 98 is aligned with the others and is positioned between the receiver top wall 80 and the receiver bottom wall 82. For example, the plurality of light sensors 98 may cover the pole height 55 whereby the plurality of light sensors 98 can communicate with the plurality of lights 76 to measure any vehicle height 19 that is between the height of the receiver bottom wall 82 and the receiver top wall 80.

The plurality of light sensors 98 is controlled by the receiver processor 94. The plurality of light sensors 98 sense light emitted from the plurality of lights 76 whereby the pair of poles 54 determines the vehicle height 19 when the vehicle height 19 is less than the pole height 55. For example, the emitter front side 66 may be aligned with the receiver front side 88 across the roadway 14 such that the plurality of lights 76 is aligned with the plurality of light sensors 98.

The plurality of lights 76 emits light toward the plurality of light sensors 98. The vehicle 18 blocks the lower portion 100 of the plurality of lights 76 from reaching the plurality of light sensors 98. The lower portion 100 is generally at or below the vehicle height 19 when the vehicle 18 drives between the pair of poles 54. The plurality of light sensors 98 senses an upper portion 102 of the plurality of lights 76 when the vehicle 18 drives between the pair of poles 54. The upper portion 102 is generally above the vehicle height 19. The receiver processor 94 may determine the vehicle height 19 by measuring the lower portion 100 of the plurality of lights 76 that is blocked from the plurality of light sensors 98 by the vehicle 18. The receiver processor 94 communicates the vehicle height 19 to the panel central processing unit 34.

The display panel 20 provides a positive indicium 104 on the screen 30 when the vehicle height 19 is less than the clearance height 13. For example, the positive indicium 104 may comprise a green light. The display panel 20 provides a negative indicium 106 on the screen 30 when the vehicle height 19 is equal to or greater than the clearance height 13. For example, the negative indicium 106 may comprise a red light.

Any of the panel central processing unit 34, emitter processor 72, and receiver processor 94 may include a memory unit that stores the clearance height 13 beneath the overhead obstruction. Any of the panel central processing unit 34, emitter processor 72, and receiver processor 94 can perform the calculation to determine whether the vehicle height 19 measured by the pair of poles 54 is equal to or greater than the clearance height 13.

In use, the pair of poles 54 determines the vehicle height 19 based on which of the plurality of lights 76 is blocked from the plurality of light sensors 98 as the vehicle 18 drives between the emitter pole 56 and the receiver pole 78. The panel central processing unit 34 actuates the screen 30 to display either a positive 104 or negative 106 indicium indicating to the user whether or not it is safe for the vehicle 18 to proceed beneath the overhead obstruction 12. If the screen 30 displays the negative indicium 106, the user can stop the vehicle 18 before colliding with the overhead obstruction 12. The vehicle height sensing system 10 can thus provide real-time feedback for the user without relying on the user's memory of the vehicle height 19 and without requiring the user to install or retrofit the system 10 onto the vehicle 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A vehicle height sensing system comprising:
   an overhead obstruction having a clearance height and being positioned over a roadway;
   a vehicle having a vehicle height;

a display panel being configured to be visible from the vehicle when the vehicle is driving toward the overhead obstruction;
a measurement device being in communication with and operationally coupled to the display panel, the measurement device being configured to measure the vehicle height and communicate the vehicle height to the display panel, the measurement device comprising:
a pair of poles being aligned with each other across the roadway, the pair of poles being positioned on opposite shoulders of the roadway and being spaced from the overhead obstruction, each of the pair of poles being in communication with the other whereby the pair of poles determines the vehicle height;
the display panel providing a positive indicium when the vehicle height is less than the clearance height, the display panel providing a negative indicium when the vehicle height is greater than the clearance height, the display panel including:
a panel front side, a panel back side, and a peripheral side extending therebetween to define an inner area;
a screen being coupled to the panel front side;
a panel power source being positioned in the inner area; and
a panel central processing unit being positioned in the inner area, the panel central processing unit being electronically coupled to the panel power source and the screen, the panel central processing unit controlling information being displayed on the screen; and
an attachment coupling the display panel to the overhead obstruction, the attachment including:
a first member extending outwardly from the back side of the display panel, the first member having a length being configured to exceed a width of a barrier extending upwardly from the overhead obstruction;
a second member being pivotably attached to the first member, the second member pivoting between an upward position and a downward position, the second member being perpendicular to and extending downwardly from the first member when the second member is in the downward position;
the second member having an aperture therein, the aperture being aligned with a channel extending into the back side when the second member is in the downward position; and
a fastener extending through the aperture and engaging the channel whereby the second member is locked into the downward position and the back side is coupled to the overhead obstruction.

2. The vehicle height sensing system of claim 1, the pair of poles further comprising:
an emitter pole having an emitter top wall, an emitter bottom wall, and an emitter peripheral wall extending therebetween defining an emitter interior space, the emitter peripheral wall having an emitter front side and an emitter rear side, the emitter pole comprising:
an emitter power source being positioned in the emitter interior space;
an emitter processor being positioned in the emitter interior space and being electronically coupled to the emitter power source;
a plurality of lights being coupled to the emitter front side, the plurality of lights being aligned with each other and being positioned between the emitter top wall and the emitter bottom wall, the plurality of lights being electronically coupled to and controlled by the emitter processor;
a receiver pole having a receiver top wall, a receiver bottom wall, and a receiver peripheral wall extending therebetween defining a receiver interior space, the receiver peripheral wall having a receiver front side and a receiver rear side, the receiver pole comprising:
a receiver power source being positioned in the receiver interior space;
a receiver processor being positioned in the receiver interior space and being electronically coupled to the receiver power source, the receiver processor being in communication with the panel transceiver;
a plurality of light sensors being coupled to the receiver front side, the plurality of light sensors being aligned with each other and being positioned between the receiver top wall and the receiver bottom wall, the plurality of light sensors being controlled by the receiver processor, the plurality of light sensors sensing light emitted from the plurality of lights;
the emitter front side being aligned with the receiver front side across the roadway such that the plurality of lights is aligned with the plurality of light sensors; and
the plurality of lights emitting light toward the plurality of light sensors, the vehicle blocking a lower portion of the plurality of lights from reaching the plurality of light sensors when the vehicle drives between the pair of poles, the lower portion being below the vehicle height, the plurality of light sensors sensing an upper portion of the plurality of lights when the vehicle drives between the pair of poles, the upper portion being above the vehicle height, the receiver processor determining the vehicle height by measuring the lower portion of the plurality of lights being blocked from the plurality of light sensors by the vehicle, the receiver processor communicating the vehicle height to the panel central processing unit.

3. The vehicle height sensing system of claim 2, the display panel further comprising a panel transceiver being positioned in the inner area, the panel transceiver being electronically coupled to and in communication with the panel central processing unit.

4. The vehicle height sensing system of claim 3, the pair of poles further comprising:
an emitter transceiver being positioned in the emitter interior space, the emitter transceiver being electronically coupled to and in communication with the emitter processor; and
a receiver transceiver being positioned in the receiver interior space, the receiver transceiver being electronically coupled to and in communication with the receiver processor, the receiver transceiver being in communication with the emitter transceiver and with the panel transceiver.

5. The vehicle height sensing system of claim 2, the plurality of lights further comprising infrared laser lights.

6. The vehicle height sensing system of claim 1, the positive indicium further comprising a green light.

7. The vehicle height sensing system of claim 1, the negative indicium further comprising a red light.

8. A vehicle height sensing system comprising:
an overhead obstruction having a clearance height and being positioned over a roadway;
a vehicle having a vehicle height;
a display panel being configured to be visible from the vehicle when the vehicle is driving toward the overhead obstruction, the display panel comprising:
a front side, a back side, and a peripheral side extending therebetween to define an inner area;

a screen being coupled to the front side;
a panel power source being positioned in the inner area;
a panel central processing unit being positioned in the inner area, the panel central processing unit being electronically coupled to the panel power source and the screen, the panel central processing unit controlling information being displayed on the screen;
a panel transceiver being positioned in the inner area, the panel transceiver being electronically coupled to and in communication with the panel central processing unit;
an attachment coupling the display panel to the overhead obstruction, the attachment comprising:
a first member extending outwardly from the back side of the display panel, the first member having a length being configured to exceed a width of a barrier extending upwardly from the overhead obstruction;
a second member being pivotably attached to the first member, the second member pivoting between an upward position and a downward position, the second member being perpendicular to and extending downwardly from the first member when the second member is in the downward position;
the second member having an aperture therein, the aperture being aligned with a channel extending into the back side when the second member is in the downward position;
a fastener extending through the aperture and engaging the channel whereby the second member is locked into the downward position and the back side is coupled to the overhead obstruction;
a measurement device being in communication with and electronically coupled to the display panel, the measurement device being configured to measure the vehicle height and communicate the vehicle height to the display panel, the measurement device comprising:
a pair of poles being aligned with each other across the roadway, the pair of poles being positioned on opposite shoulders of the roadway and being spaced from the overhead obstruction, each of the pair of poles having a pole height which exceeds the clearance height, each of the pair of poles being in communication with the other whereby the pair of poles determines the vehicle height, the pair of poles comprising:
an emitter pole having an emitter top wall, an emitter bottom wall, and an emitter peripheral wall extending therebetween defining an emitter interior space, the emitter peripheral wall having an emitter front side and an emitter rear side, the emitter pole comprising:
an emitter power source being positioned in the emitter interior space;
an emitter processor being positioned in the emitter interior space and being electronically coupled to the emitter power source;
an emitter transceiver being positioned in the emitter interior space, the emitter transceiver being electronically coupled to and in communication with the emitter processor;
a plurality of lights being coupled to the emitter front side, the plurality of lights being aligned with each other and being positioned between the emitter top wall and the emitter bottom wall, the plurality of lights being electronically coupled to and controlled by the emitter processor;
the plurality of lights comprising infrared laser lights;
a receiver pole having a receiver top wall, a receiver bottom wall, and a receiver peripheral wall extending therebetween defining a receiver interior space, the receiver peripheral wall having a receiver front side and a receiver rear side, the receiver pole comprising:
a receiver power source being positioned in the receiver interior space;
a receiver processor being positioned in the receiver interior space and being electronically coupled to the receiver power source;
a receiver transceiver being positioned in the receiver interior space, the receiver transceiver being electronically coupled to and in communication with the receiver processor, the receiver transceiver being in communication with the emitter transceiver and with the panel transceiver;
a plurality of light sensors being coupled to the receiver front side, the plurality of light sensors being aligned with each other and being positioned between the receiver top wall and the receiver bottom wall, the plurality of light sensors being controlled by the receiver processor, the plurality of light sensors sensing light emitted from the plurality of lights whereby the pair of poles determines the vehicle height when the vehicle height is less than the pole height;
the emitter front side being aligned with the receiver front side across the roadway such that the plurality of lights is aligned with the plurality of light sensors;
the plurality of lights emitting light toward the plurality of light sensors, the vehicle blocking a lower portion of the plurality of lights from reaching the plurality of light sensors when the vehicle drives between the pair of poles, the lower portion being below the vehicle height, the plurality of light sensors sensing an upper portion of the plurality of lights when the vehicle drives between the pair of poles, the upper portion being above vehicle height, the receiver processor determining the vehicle height by measuring the lower portion of the plurality of lights being blocked from the plurality of light sensors by the vehicle, the receiver processor communicating the vehicle height to the panel central processing unit; and
the display panel providing a positive indicium when the vehicle height is less than the clearance height, the positive indicium comprising a green light, the display panel providing a negative indicium when the vehicle height is greater than the clearance height, the negative indicium comprising a red light.

* * * * *